(12) United States Patent
Yamazawa

(10) Patent No.: US 10,267,965 B2
(45) Date of Patent: Apr. 23, 2019

(54) MICROSCOPE INCLUDING MONOCHROMATIC LIGHT EMITTING DIODE AND REMOVABLE PHOSPHOR FILTER

(71) Applicant: OLYMPUS CORPORATION, Hachioji-shi, Tokyo (JP)

(72) Inventor: Yoshitsugu Yamazawa, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 3 days.

(21) Appl. No.: 15/672,166

(22) Filed: Aug. 8, 2017

(65) Prior Publication Data

US 2018/0045868 A1 Feb. 15, 2018

(30) Foreign Application Priority Data

Aug. 9, 2016 (JP) .................. 2016-156749

(51) Int. Cl.
| | |
|---|---|
| *G02B 21/00* | (2006.01) |
| *G02B 5/28* | (2006.01) |
| *G02B 21/06* | (2006.01) |
| *H05B 33/08* | (2006.01) |
| *G02B 21/08* | (2006.01) |
| *G02B 21/16* | (2006.01) |

(52) U.S. Cl.
CPC ............... *G02B 5/28* (2013.01); *G02B 21/06* (2013.01); *G02B 21/086* (2013.01); *G02B 21/16* (2013.01); *H05B 33/0803* (2013.01)

(58) Field of Classification Search
CPC ............... G02B 21/00; G02B 21/0004; G02B 21/0008; G02B 21/002; G02B 21/0024; G02B 21/0032; G02B 21/0052; G02B 21/0064; G02B 21/0076; G02B 21/06; G02B 21/08; G02B 21/082; G02B 21/086; G02B 21/088; G02B 21/12; G02B 21/16; G02B 21/36; G02B 21/361
USPC ....... 359/362, 363, 368, 369, 385, 388, 389, 359/390

See application file for complete search history.

(56) References Cited

U.S. PATENT DOCUMENTS

| | | | | |
|---|---|---|---|---|
| 8,040,598 | B2 | 10/2011 | Nolte et al. | |
| 8,894,241 | B2* | 11/2014 | Kitano | H04N 9/3114 345/208 |
| 9,297,992 | B2* | 3/2016 | Ganser | G02B 21/088 |

(Continued)

FOREIGN PATENT DOCUMENTS

JP 2013029836 A 2/2013

*Primary Examiner* — Arnel C Lavarias
(74) *Attorney, Agent, or Firm* — Holtz, Holtz & Volek PC

(57) ABSTRACT

A microscope includes: a stage on which a specimen is placed; an illumination optical system that includes a monochromatic light LED chip and a phosphor filter, which is arranged to be insertable and removable on and from an illumination optical path and is excited by light having a specific wavelength band irradiated from the monochromatic light LED chip to emit fluorescence having a longer wavelength relative to the light, the illumination optical system being configured to irradiate the specimen with illumination light; and an observation optical system that includes an absorption filter which is insertable and removable on and from an observation optical path and selectively takes fluorescence having a predetermined wavelength from the fluorescence emitted from the specimen.

6 Claims, 2 Drawing Sheets

(56) References Cited

U.S. PATENT DOCUMENTS

2009/0201577 A1\* 8/2009 LaPlante ............ G01N 21/6458
359/355
2013/0027770 A1 1/2013 Ganser et al.
2018/0045943 A1\* 2/2018 Kobayashi ........... G02B 21/088

\* cited by examiner

MICROSCOPE INCLUDING MONOCHROMATIC LIGHT EMITTING DIODE AND REMOVABLE PHOSPHOR FILTER

CROSS-REFERENCE TO RELATED APPLICATIONS

This application is based upon and claims the benefit of priority from Japanese Patent Application No. 2016-156749, filed on Aug. 9, 2016, the entire contents of which are incorporated herein by reference.

BACKGROUND

1. Technical Field

The disclosure relates to a microscope capable of bright-field observation and fluorescence observation with a single illumination optical system.

2. Related Art

Conventionally, a microscope, capable of observation by switching between an epi-illumination optical system and a transmitted-light illumination optical system according to various observation methods and observation specimens, has been used.

In recent years, microscopes using a white light emitting diode (LED), instead of a halogen lamp, as a light source of the transmitted-light illumination optical system have increased. For example, proposed is a microscope provided with a transmitted-light illumination optical system, which includes a white LED in which a phosphor of yellow or the like closely adheres on a monochromatic LED element of blue or the like, and an epi-illumination optical system which includes a fluorescence observation filter unit in which the fluorescence observation filter unit of the epi-illumination optical system is inserted and removed on and from an observation optical path by an optical path switching knob (for example, see U.S. Pat. No. 8,040,598).

In U.S. Pat. No. 8,040,598, switching between transmission bright-field observation and epifluorescence observation and switching on and off of each light source are performed by one operation of the optical path switching knob, and thus, it is easy to perform a switching operation of an observation method. However, a part of excitation light from epi-illumination with which a specimen is irradiated is transmitted through the specimen and is incident to the white LED which is the light source of the transmitting illumination optical system at the time of performing the epifluorescence observation so that the phosphor is excited and emits fluorescence, and thus, there is a problem that the fluorescence is detected as noise.

In order to solve this problem, proposed is a microscope in which a correction filter including a spectral transmission profile is insertable and removable into and from a transmitted-light illumination optical system (for example, see JP 2013-29836 A). The spectral transmission profile minimizes transmission of light having a wavelength, in which sensitivity of a spectrum is maximized, irradiated from a white light LED including a blue LED and a yellow phosphor.

SUMMARY

In some embodiments, a microscope includes: a stage on which a specimen is placed; an illumination optical system that includes a monochromatic light LED chip and a phosphor filter, which is arranged to be insertable and removable on and from an illumination optical path and is excited by light having a specific wavelength band irradiated from the monochromatic light LED chip to emit fluorescence having a longer wavelength relative to the light, the illumination optical system being configured to irradiate the specimen with illumination light; and an observation optical system that includes an absorption filter which is insertable and removable on and from an observation optical path and selectively takes fluorescence having a predetermined wavelength from the fluorescence emitted from the specimen.

The above and other features, advantages and technical and industrial significance of this disclosure will be better understood by reading the following detailed description of presently preferred embodiments of the disclosure, when considered in connection with the accompanying drawings.

DETAILED DESCRIPTION

Hereinafter, a preferred embodiment (hereinafter, referred to as the "embodiment") of the disclosure will be described in detail with reference to the drawings. Incidentally, the disclosure is not limited to this embodiment. In addition, the same reference signs will be attached to the same parts in the description of the drawings.

Embodiment

Figure 1:
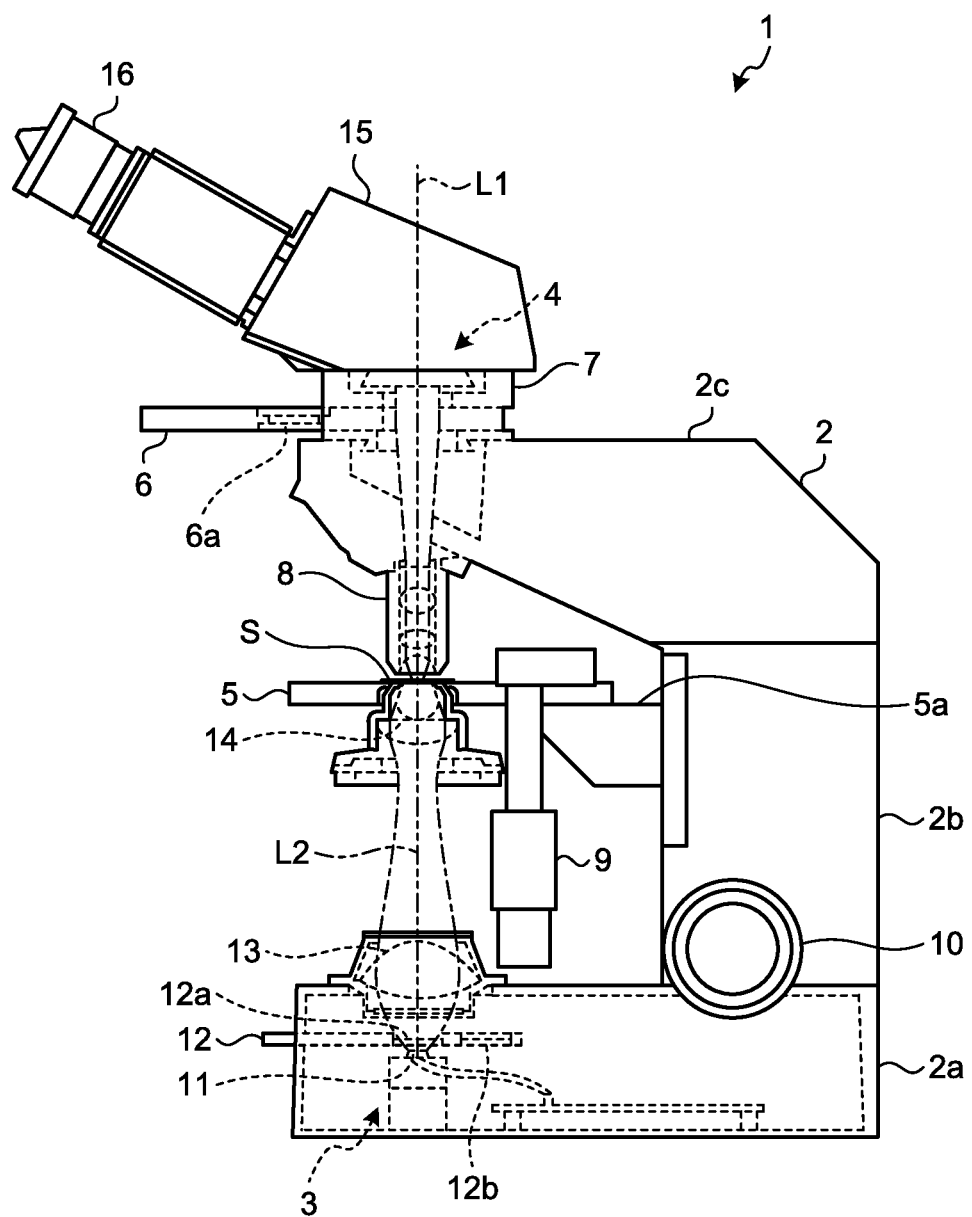
FIG. 1 is a schematic diagram illustrating the entire configuration of an upright microscope according to an embodiment of the disclosure.
Figure 2:
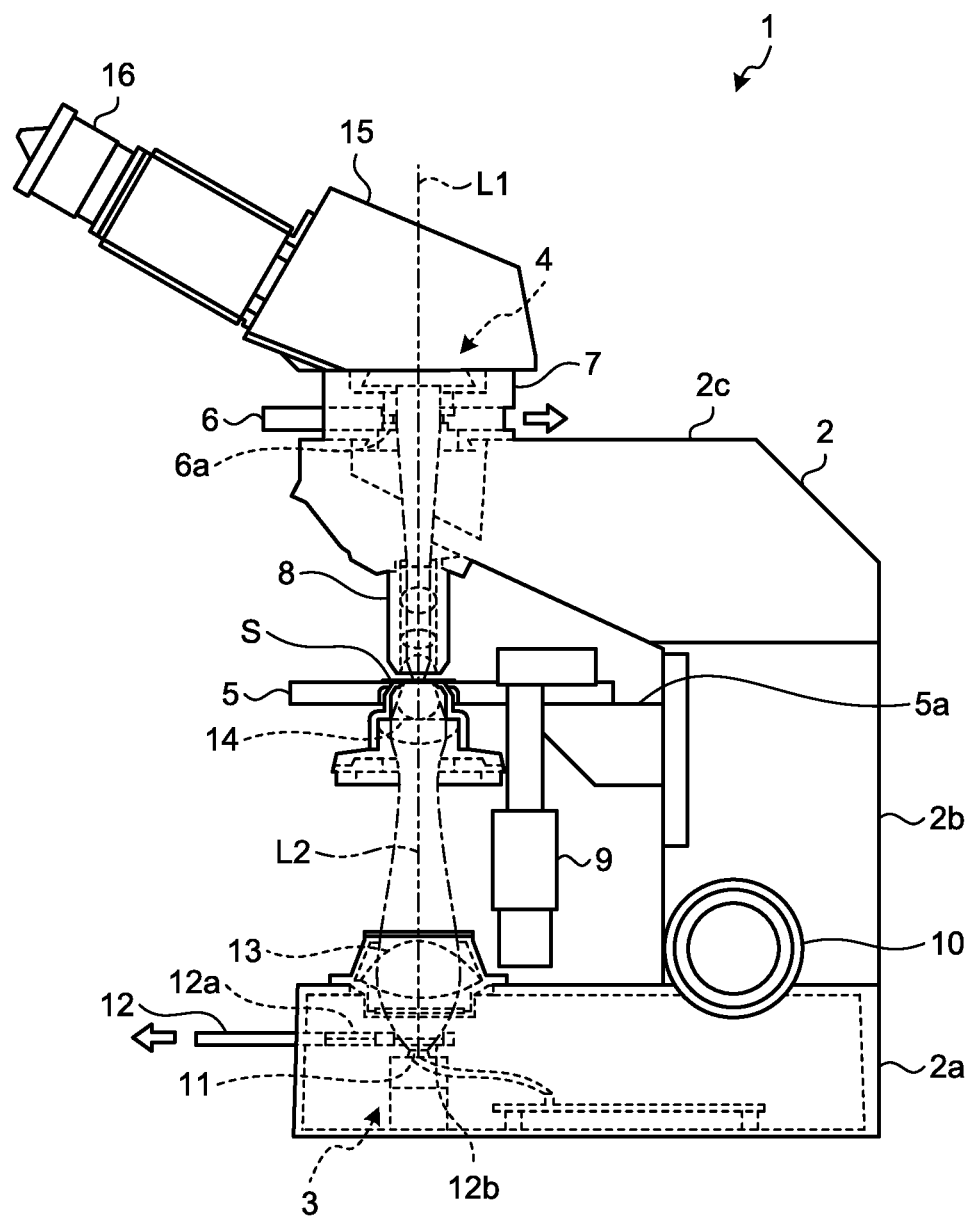
FIG. 2 is a schematic view of the upright microscope of FIG. 1 at the time of fluorescence observation.

FIG. 1 is a schematic diagram illustrating the entire configuration of an upright microscope 1 according to an embodiment of the disclosure (at the time of bright-field observation). FIG. 2 is a schematic view of the upright microscope 1 of FIG. 1 at the time of fluorescence observation. The upright microscope 1 according to the embodiment of the disclosure includes a microscope body 2, an illumination optical system 3, and an observation optical system 4.

The microscope body 2 includes a base portion 2a, a pillar portion 2b erected on a back surface side of the base portion 2a, and an arm portion 2c supported by the pillar portion 2b and extending toward a front surface side. The base portion 2a is a portion directly placed on a place such as a desk where the microscope 1 is installed, and the illumination optical system 3 is arranged inside the base portion 2a. The pillar portion 2b is erected on the back surface side (back side) of the base portion 2a and integrated with the base portion 2a at a lower end portion. The pillar portion 2b holds a stage 5 via a stage holding portion 5a. A specimen S is placed on the stage 5. The arm portion 2c extends from an upper end of the pillar portion 2b toward the front surface side of the microscope 1, and an intermediate lens-barrel 7, which allows a filter holder 6 on which an absorption filter 6a to be described later is mounted to be insertable and removable on and from an observation optical path L1, is attached at an upper side of the arm portion 2c. In addition, an objective lens 8 is attached onto the observation optical path L1 on a lower side of the arm portion 2c. In the present specification, the front surface side of the upright microscope 1 is a side on which an observer is positioned, and the back surface side is a side facing the front surface side.

The specimen S is moved together with the stage 5 in a front-rear direction, and the specimen S is moved in a lateral direction via a clip (not illustrated) by operating an operation handle 9 attached to the stage 5. A focusing handle 10 is arranged on a side surface of the microscope body 2 and is connected to the stage 5 by a rack and pinion mechanism (not illustrated) built in the microscope body 2. The stage 5 is raised and lowered in an optical path direction via the rack and pinion mechanism using a rotation operation of the focusing handle 10.

The illumination optical system 3 is an optical element configured to perform transmission observation. The illumination optical system 3 includes a monochromatic light LED chip 11, a filter unit 12 including a phosphor filter 12a and an excitation filter 12b, a collector lens 13, and a condenser lens 14. The filter unit 12 is attached to be insertable and removable into and from the base portion 2a of the microscope body 2 such that an excitation filter 12b is inserted on an illumination optical path L2 in the case of performing the fluorescence observation and a phosphor filter 12a is inserted on the illumination optical path L2 in the case of performing bright-field observation.

The monochromatic light LED chip 11 irradiates light having a specific wavelength band within a wavelength range of 380 nm to 495 nm.

The phosphor filter 12a is excited by light having the wavelength range of 380 nm to 495 nm irradiated from the monochromatic light LED chip 11 to emit fluorescence having a longer wavelength relative to the irradiated light. It is possible to use the phosphor filter 12a including a yellow phosphor or red and green phosphors in the case of using a blue LED as the monochromatic light LED chip 11, and to use the phosphor filter 12a including red, green and blue phosphors in the case of using a purple LED. The monochromatic light LED chip 11 and the phosphor filter 12a function as the white LED when being combined, and the specimen S is irradiated with white light irradiated from the white LED using the collector lens 13 and the condenser lens 14.

The excitation filter 12b extracts excitation light having a predetermined wavelength band from the light having the wavelength of 380 nm to 495 nm that is irradiated from the monochromatic light LED chip 11. Only the excitation light having a necessary excitation wavelength irradiated from the monochromatic light LED chip 11 is transmitted through the excitation filter 12b and is emitted to the specimen S by the collector lens 13 and the condenser lens 14.

The observation optical system 4 includes: the objective lens 8; the filter holder 6 including the absorption filter 6a; a lens barrel 15 in which a relay lens and a tube lens (not illustrated) are built; and an eyepiece 16.

The absorption filter 6a selectively takes fluorescence having a specific wavelength from the fluorescence emitted from the specimen S at the time of fluorescence observation. The filter holder 6 is mounted to be insertable and removable into and from the intermediate lens-barrel 7 such that the absorption filter 6a is inserted and positioned on the observation optical path L1 in the case of performing the fluorescence observation and the absorption filter 6a is removed from the observation optical path L1 in the case of performing the bright-field observation.

The bright-field observation is performed by irradiating the specimen S with the white light using the optical system for bright-field observation, that is, the monochromatic light LED chip 11, the phosphor filter 12a, the collector lens 13, and the condenser lens 14, and visually observing white light transmitted through the specimen S among the irradiated white light through the objective lens 8, a relay lens and a tube lens (not illustrated), and the eyepiece 16.

On the other hand, the fluorescence observation is performed by irradiating the specimen S with excitation light using the optical system for fluorescence observation, that is, the monochromatic light LED chip 11, the excitation filter 12b, the collector lens 13, and the condenser lens 14, and visually observing the fluorescence excited by the excitation light through the objective lens 8, the absorption filter 6a, the relay lens and the tube lens (not illustrated), and the eyepiece 16.

In the upright microscope 1 according to the embodiment of the disclosure, it is possible to perform the bright-field observation and the fluorescence observation with the single illumination optical system 3 by inserting and removing the filter unit 12 and the filter holder 6, and it is possible to perform the fluorescence observation without noise regardless of a type of the white LED to be used.

Incidentally, the filter unit 12 including the phosphor filter 12a and the excitation filter 12b is used in the above-described embodiment. However, it is also possible to configure a filter unit including only the phosphor filter 12a such that the phosphor filter 12a is inserted on the illumination optical path L2 at the time of bright-field observation and the phosphor filter 12a is removed from the illumination optical path L2 at the time of fluorescence observation. In addition, the filter holder 6 including the absorption filter 6a may be configured to remain inserted on the observation optical path L1 even at the time of bright-field observation without being configured to be removable.

Further, the filter unit 12 including the phosphor filter 12a and the single excitation filter 12b is used in the above-described embodiment. However, it is also possible to use a filter unit including a phosphor filter and two excitation filters that extract excitation light having different wavelengths.

Further, the description has been given regarding the upright microscope including the single transmitted-light illumination optical system in the above-described embodiment. However, the disclosure may be provided with an epi-illumination optical system that includes a monochromatic light LED chip and a phosphor filter which is insertable and removable on and from an illumination optical path and is excited by light having a specific wavelength band irradiated from the monochromatic light LED chip to emit fluorescence having a longer wavelength relative to the irradiated light. In addition, an inverted microscope provided with a single transmitted-light illumination optical system or a single epi-illumination optical system having the same configuration also can perform the bright-field observation and the fluorescence observation with the single illumination optical system, and can perform the fluorescence observation without noise regardless of the type of the white LED to be used.

The microscope of the disclosure is advantageous in clinical tests in which bright-field observation and fluorescence observation are switched to observe one specimen, for example, positive and negative diagnosis on tubercle bacillus, malaria, and the like using multiple staining solution, an asbestos test, and the like.

According to the disclosure, it is possible to perform fluorescence observation and bright-field observation with a single illumination optical system and to perform the fluorescence observation without noise regardless of a type of a white LED to be used. In addition, since it is possible to perform the fluorescence observation and the bright-field observation with the single illumination optical system, it is possible to provide a microscope with excellent cost performance.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A microscope comprising:
    a stage configured to have a specimen placed thereon;
    an illumination optical system that includes a monochromatic light emitting diode (LED) chip and a phosphor filter, wherein the phosphor filter is arranged to be insertable on and removable from an illumination optical path and is configured to be excited by light having a specific wavelength band irradiated from the monochromatic LED chip to emit fluorescence having a longer wavelength than the light irradiated from the monochromatic LED chip, the illumination optical system being configured to irradiate the specimen with illumination light; and
    an observation optical system that includes an absorption filter which is insertable on and removable from an observation optical path and is configured to selectively take fluorescence having a predetermined wavelength from fluorescence emitted from the specimen.

2. The microscope according to claim 1, further comprising:
    a filter holder configured to hold the absorption filter and arrange the absorption filter on the observation optical path.

3. The microscope according to claim 1, wherein the illumination optical system includes a filter unit configured to:
    hold the phosphor filter and an excitation filter; and
    selectively arrange the excitation filter on the illumination optical path, the excitation filter being configured to extract excitation light having a predetermined wavelength band from the light having the specific wavelength band irradiated from the monochromatic LED chip.

4. The microscope according to claim 2, wherein the illumination optical system includes a filter unit configured to:
    hold the phosphor filter and a filter unit; and
    selectively arrange the excitation filter on the illumination optical path, the excitation filter being configured to extract excitation light having a predetermined wavelength band from the light having the specific wavelength band irradiated from the monochromatic LED chip.

5. The microscope according to claim 1, wherein the phosphor filter is configured to emit white light by being excited by the light having the specific wavelength band irradiated from the monochromatic LED chip.

6. The microscope according to claim 3, wherein the phosphor filter is configured to emit white light by being excited by the light having the specific wavelength band irradiated from the monochromatic LED chip.

* * * * *